United States Patent [19]
Berger et al.

[11] Patent Number: 6,021,245
[45] Date of Patent: Feb. 1, 2000

[54] METHOD AND OPTICAL TRANSMISSION SYSTEM FOR COMPENSATING DISPERSION IN OPTICAL TRANSMISSION PATHS

[75] Inventors: Matthias Berger, Burgthann; Alfons Schinabeck, Hetzles; Bernhard Schmauss, Theisseil; Dieter Werner, Erlangen, all of Germany

[73] Assignee: Lucent Technologies Inc., Murray Hill, N.J.

[21] Appl. No.: 09/124,272

[22] Filed: Jul. 29, 1998

[51] Int. Cl.[7] ....................................... G02B 6/02
[52] U.S. Cl. .............................. 385/123; 359/161; 385/27
[58] Field of Search .............................. 385/27, 100, 123, 385/24, 31; 372/6; 359/160, 161, 173, 341, 331, 326, 124, 337, 176, 181

[56] References Cited

U.S. PATENT DOCUMENTS

| | | | |
|---|---|---|---|
| 5,400,165 | 3/1995 | Gnauck et al. ........................ | 359/161 |
| 5,793,917 | 8/1998 | Yoshimura ............................ | 385/100 |
| 5,864,421 | 1/1999 | Suzuki et al. ........................ | 359/331 |
| 5,887,093 | 3/1999 | Hansen et al. ........................ | 385/27 |
| 5,946,119 | 8/1999 | Bergano et al. ...................... | 359/124 |

*Primary Examiner*—Akm E. Ullah

[57] ABSTRACT

The invention relates to a method and an optical transmission system for compensation of dispersion in optical transmission lines in which dispersion compensation fibers are applied, with the dispersion compensation fibers being arranged at the beginning as well as at the end of the line segments of the optical fibers forming the transmission line. The signal distortions due to non-linear effects are reduced by making use of the recognition that non-linearities should only occur at as small as possible an accumulated dispersion. This is obtained by an unequal division of the dispersion compensation fiber applied for the compensation of the dispersion of the optical fiber, with the part of the dispersion compensation fiber attached at the beginning of a line segment being directly connected to the optical fiber and having an accumulated dispersion which is smaller as to amount than the accumulated dispersion of the part of the dispersion compensation fiber attached at the end of the optical fiber.

6 Claims, 2 Drawing Sheets

METHOD AND OPTICAL TRANSMISSION SYSTEM FOR COMPENSATING DISPERSION IN OPTICAL TRANSMISSION PATHS

BACKGROUND OF THE INVENTION

The invention relates to optical transmission; more particularly to a method and an optical transmission system for compensation of dispersion optical transmission lines in which dispersion compensation fibers are applied.

DESCRIPTION OF THE PRIOR ART

The standard single mode fibers (SSMF) used for optical transmission systems have, at a wave length of ca. 1550 nm, a dispersion (group velocity dispersion: GVD) of about 17 ps(nm-km). Especially with high bit rates and long transmission lines the dispersion causes signal distortions at the ends of the transmission line. In the past, various methods for compensation of the dispersion have been developed. Presently, for compensation of the dispersion special fibers, so-called dispersion compensation fibers (DCF) are applied, which have a negative dispersion. The dispersion of the DCF is usually greater than the dispersion of the SSMF, so that fiber lengths of the DCF which are essentially shorter than the transmission line are sufficient for compensation. A usual value for the dispersion of the DCF is e.g. 100 ps(nm-km). With these fibers it is possible to compensate exactly the dispersion of a certain wavelength if the spread of the signal in the fiber is not influenced additionally by non-linear effects. However, long line segments require large optical signal power, which inevitably causes non-linear effects.

As the most commonly applied methods for the compensation of the dispersion, the so-called pre- and post-compensations have become known. They differ with regard to the position of the DCF in relation to the SSMF used as the line segment, and have been shown in FIGS. 2 and 3 for better understanding.

FIG. 2a shows the precompensation, in which the DCF is located before the SSMF. A transmission system with two line segments 1 and 2 has been represented. Line segment 1 has a line amplifier 3, a DCF 6, and an SSMF 8, which forms the line segment 1 proper. Likewise the second line segment 2 has a segment amplifier 4, a DCF 7, and an SSMF 9. Finally, an amplifier 5 is provided, which amplifies the transmitted signal at the end of the transmission system for further processing. At the start of every line section 1 and 2, thus for precompensation, the DCFs 6 and 7 are so proportioned that the accumulated dispersion reaches a value which corresponds as to amount to the dispersion accumulated across the length of the SSMFs 8 or 9, whereby at the end of the SSMF 8 or 9 a value for the accumulated dispersion is attained which is ideally equal to zero. The accumulated dispersion resulting across the length of the transmission route has been shown in FIG. 2b. At the beginning of the line segment 1, because of the DCF 6 a negative accumulated dispersion is given, which compensates as to amount exactly the positive accumulated dispersion of the SSMF 8. At the end of the line section 1, therefore, the accumulated dispersion is zero. The corresponding holds for line segment 2.

FIG. 3a shows the postcompensation, in which the SSMF is located ahead of the DCF. A transmission system with two line segments 1 and 2 has been illustrated. Line segment 1 has a line amplifier 3, an SSMF 8 which forms the line segment 1 proper, and a DCF 6'. Also the second line segment 2 has a segment amplifier 4, an SSMF 9 and a DCF 7'. Finally, there is a amplifier 5, which amplifies the transmitted signal at the end of the transmission system for further amplification. At the end of the line segments 1 and 2 there are the DCFs 6' and 7', dimensioned so that the value of the accumulated dispersion corresponds by amount to the dispersion accumulated in the SSMFs 8 or 9, whereby a value is attained for each respective line segment for the accumulated dispersion, which is, ideally, equal to zero. FIG. 3b represents the accumulated dispersion resulting over the length of the transmission line. Via the SSMF 8 of the line section 1, a positive dispersion is accumulated and neutralized completely by the negative accumulated dispersion of the DCF 6', so that the accumulated dispersion at the end of the line segment 1 is zero. The corresponding is valid for the line segment 2.

From FIGS. 2 and 3 it can be seen that with precompensation the DCFs 6 or 7, and with postcompensation the SSMFs 8 or 9, are fed a large amount of optical power via the segment amplifiers 3 or 4, which optical power must be amplified further because of the losses in the additionally applied compensation fibers. As mentioned in the beginning, this has a special importance with regard to non-linear effects (self-phase modulation, cross phase modulation, four wave mixing), which cause a distortion of the signal to be transmitted. In this context, the self-phase modulation (SPM) is of special importance, as it causes a frequency shift at the pulse edges of the signal to be transmitted and thus results in an additional influence on the signal by the dispersion in the fiber. Additional problems occur when the known optical transmission systems are applied to transmit several signals transmitted on different wavelengths (wavelength division multiplexing WDM), especially if fluctuations of the signal power occur, e.g. because the WDM system makes possible a variable number of channels at a constant overall optical power.

From the Offenlegungsschrift EP 0 730 354 A2 a dispersion compensation for optical transmission segments is known which reduces the influence of non-linear effects. This is obtained by means of compensation constituted of a combination of pre- and post-compensation. The known dispersion compensation is represented in FIG. 4a. The represented transmission line with two line segments 1 and 2 has six amplifiers 10 to 15, three DCFs 16 to 18, and two SSMFs 8 and 9 which form the line segments proper. If identical fibers are used for DCFs 16 to 18, then DCFs 16 and 18 are one-half the length of DCF 17. The length is determined in the same way as in the case of the above described pre- or post-compensation. Amplifiers 10 and 15 are respectively arranged between DCF and SSMF or SSMF and DCF.

With the known compensation—as represented in FIG. 4b—it is achieved that the overall resulting accumulated dispersion of the transmission line equals zero. DCF 16 provides a negative accumulated dispersion which corresponds as to amount to one half the positive accumulated dispersion of the SSMF 8. Thus at the end of the SSMF 8 the accumulated dispersion has one half the value of the dispersion accumulated exclusively in SSMF 8. By means of DCF 17 a negative accumulated dispersion is created anew, which balances the accumulated dispersion and the dispersion of the half of SSMF 9, whereby a negative dispersion comes up, which corresponds as to amount to one half of the dispersion accumulating inside the SSMF. At the end of the transmission line the accumulated dispersion is finally completely compensated by the DCF 18. Since the maximum occurring accumulated dispersion assumes at the most half the value as would result with pre- and post-compensation, the non-linear signal distortions are reduced overall.

The dispersion compensation known from the mentioned state of the art, however, has the disadvantage that the segment amplifiers 11 and 13, which have, because of the greatest possible length of the SSMFs 8 and 9, a high output power, reinforce the signal to be transmitted at the point where there is always the greatest accumulated dispersion, i.e. one half the amount of the dispersion of the SSMF which forms the line section. Besides, the known optical transmission line has the disadvantage that, ahead of each of the fibers applied, i.e. the DCFs as well as the SSMFs, an amplifier is needed.

SUMMARY OF THE INVENTION

The present invention provides a method and an optical transmission system for compensation of distortion in optical transmission lines, in which dispersion compensation fibers are applied, with the dispersion compensation fibers being arranged at the beginning as well as at the end of the line segments of the optical fibers forming the transmission line, in which, in contra-distinction to the state of the art, the negative influence of non-linear effects is further reduced and at the same time a simple construction of the optical transmission system is made possible.

According to the invention the optical transmission system comprises dispersion compensation fibers for each line section, these being arranged at the beginning and at the end of each line section, with their total accumulated dispersion corresponding as to amount to the accumulated dispersion of the optical fiber which forms the line section, with the dispersion compensation fiber being connected at the beginning of the transmission line directly to the optical fiber and having an accumulated dispersion which is in amount smaller than one half of the accumulated dispersion of the optical fiber forming the line section.

At that the invention starts from the consideration that a limitation of the non-linear effects can be reached if, in regions with high signal power, a dispersion as small as possible exists. This can be obtained if at the beginning of each transmission segment, or each line segment, where the coupling-in of the greatest signal power occurs, the accumulated dispersion is held as small as possible. To this end the dispersion compensation fiber is divided into two unequal parts and arranged at the beginning and at the end of the optical fiber which forms the line section, with the part arranged at the beginning having a smaller amount of accumulated dispersion than the part arranged at the end of the optical fiber. In this manner, the non-linearities are distributed on the first part of the dispersion compensation fiber and on the beginning of the optical fiber directly connected to it, and, due to the different signs of the dispersion of the optical fiber and the dispersion compensation fiber, there results for the region of the fibers in which the signal power is high only a low amount of accumulated dispersion.

The advantage of the invention consists in particular in that due to the decrease of the accumulated dispersion in the region of high signal power the action of the non-linear effects is strongly reduced, and that the described dispersion compensation makes possible a simpler construction of the transmission line, because signal amplifiers can be saved.

BRIEF DESCRIPTION OF THE DRAWING

Further advantages of the invention result from the dependent claims and the following description of the invention, based on illustrations. There are shown in:

DETAILED DESCRIPTION

The figures represent only the component parts of the optical transmission systems necessary for the present invention. In particular there are missing the components required for signal processing in a transmission system, such as transmitter or receiver at the beginning or the end of the transmission lines and the component parts needed for the connection of the individual fibers.

Mutually corresponding parts are marked in the figures by identical references.

Figure 1:
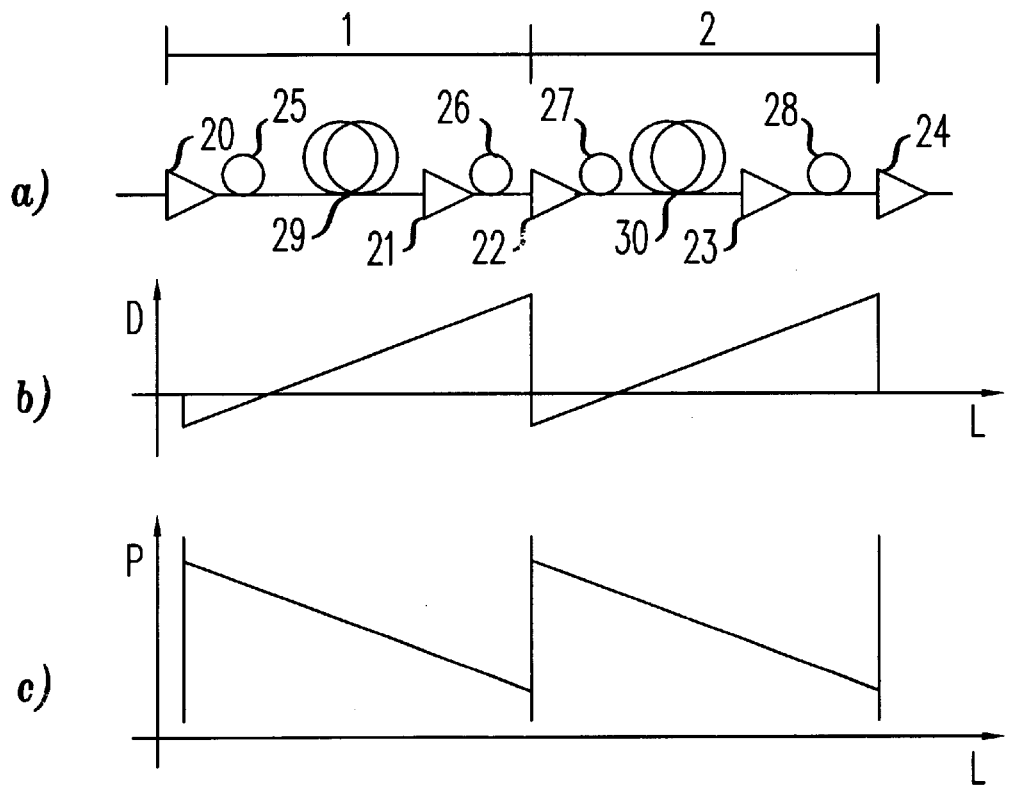
FIG. 1 is an optical transmission line segment according to the invention, as well as the resulting accumulated dispersion and signal power.

FIG. 1a shows an optical transmission system with line segments 1 and 2. The first line segment 1 is formed of a segment amplifier 20 to amplify the optical signal to be transmitted, a first dispersion compensation fiber (DCF) 25, an optical fiber forming the line section 1 proper (SSMF) 29, an amplifier 21 and a second DCF 26. The second line segment 2 is formed of a segment amplifier 22, a first DCF 27, an SSMF 30 forming the line segment 2 proper, an amplifier 23 and a second DCF 28. The further represented amplifier 24 serves to amplify the transmitted optical signal for further processing.

Figure 4:
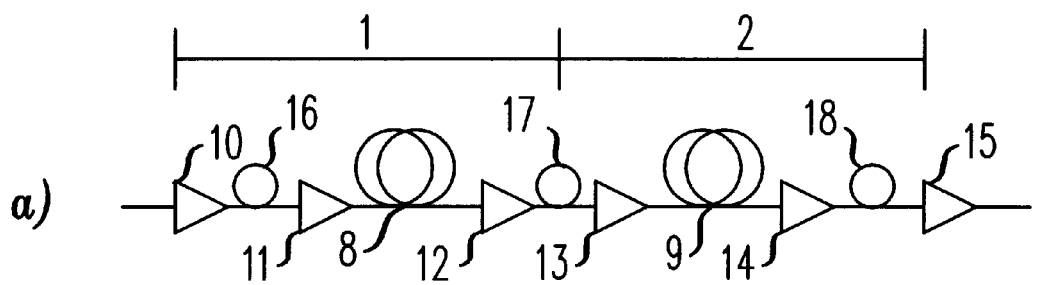
FIG. 4 is a known optical transmission line with divided compensation, as well as the resulting accumulated dispersion.
Figure 4:
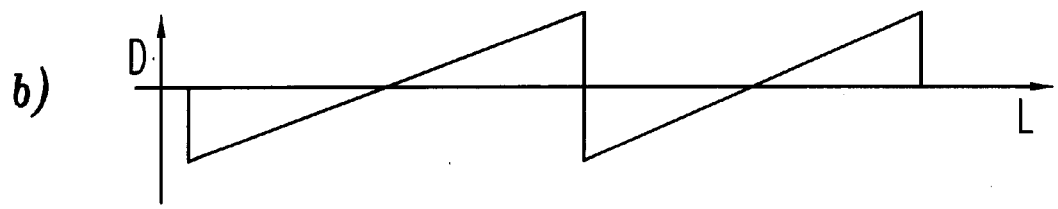

Starting from the recognition that non-linearities are to be effective only at a low accumulated dispersion, it is necessary to consider the signal power occurring at the respective line segments 1 and 2. The signal power is greatest immediately after the line segment amplifier 20. The signal power diminishes at the spread of the signal in the DCF 25 and the SSMF 29, due to the attenuation properties of the fibers 25 and 29. Inasmuch as the non-linearities become effective only up to a certain signal power, the consequence of the properties of the fibers used is the length, and thereby the accumulated dispersion at the end of the DCF 25. The length of the DCF 25 is so determined that non-linear effects occur in the DCF 25 as well as in the SSMF 29. The accumulated dispersion is shown in FIG. 1b, the optical signal power in FIG. 1c. As becomes clear from the presentation, there results because of the opposite signs of the dispersion of DCF 25 (negative dispersion) and SSMF 29 (positive dispersion) in total a small accumulated dispersion in the region of high signal power, and thus a reduced influence of the non-linear effects. Thus it becomes altogether possible to increase the output power of the segment amplifier 20, whereby the losses in the DCF 25 can be compensated, longer line segments can be made possible, and amplifiers additional to the state of the art (see FIGS. 4a, 11, 13) can be saved. At a sufficient signal-to-noise ratio it is even possible to omit the amplifiers 21 or 23, yet if they are to be applied to improve the signal-to-noise ratio, their output power is to be proportioned such that no nonlinear effects occur in the following DCFs 26 or 28.

Corresponding to the descriptions for line segment 1, line segment 2 is constructed in an analogous manner.

In the above described manner the values for the accumulated dispersion of the DCF 25 or 27 are determined, which amount to less that half the value of the accumulated dispersion of the SSMFs 29 or 30. The values for the accumulated dispersion of the DCFs 26 or 28 are to be determined so that together with the accumulated values of DCF 25 or 27 they always correspond to the value of the accumulated dispersion of SSMFs 29 or 30. Therefore, line segments 1 and 2, and thus the entire line segment of transmission, do not have at their termination a residual dispersion, for which reason they are ideally compensated in case of linear expansion.

Figure 2:
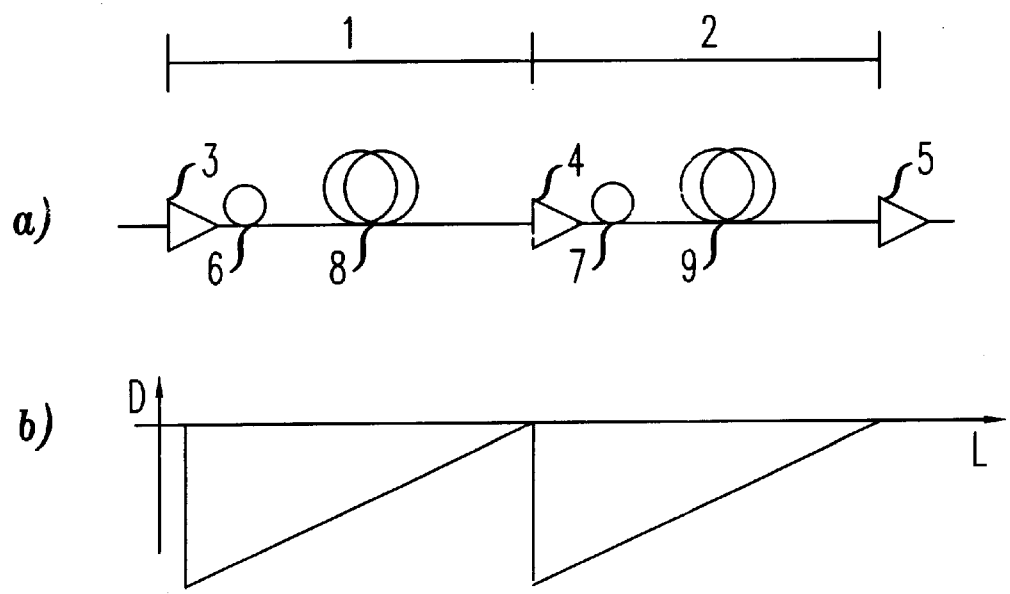
FIG. 2 is a known optical transmission line segment with precompensation, as well as the resulting accumulated dispersion.
Figure 3:
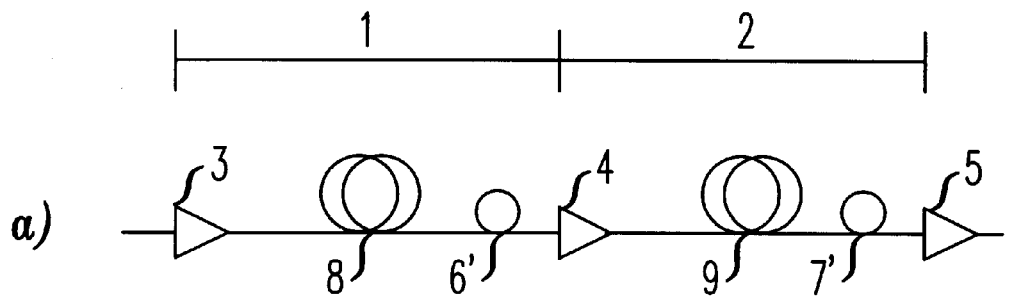
FIG. 3a–b are known optical transmission line with postcompensation as well as the resulting accumulated dispersion.

For an experimental construction of an optical transmission system for transmitting signals with a data rate of 10 Gbit/s with two line segments 1 and 2 of 100 km length each, at an accumulated dispersion of the line segments 1 and 2 of 1700 ps/nm each, an accumulated dispersion of −280 ps/nm has been determined for the first DCF 25 or 27. Correspondingly, there results for the second DCF 26 or 28 a value of −1420 ps/nm. To avoid non-linear effects on the second DCF 26 or 28, for the amplifier 21 or 23 an output of 0 dBm has been applied. To avoid non-linear effects in the second DCF 26 or 28, an output power of 0 dBm has been used for the amplifiers 21 and 23. At a variation of the output power of the line amplifier 20 or 22 of +10 to +14.5 dBm an increasing improvement of the sensitivity at the end of the transmission route could be observed. A limitation of the transmission quality by non-linear effects thus does not yet appear even at the mentioned high signal powers. With a construction according to FIGS. 2 and 3 a deterioration of the sensitivity above +10 dBm or +8 dBm could be observed.

Since the accumulated dispersion at the end of each line segment equals zero, the optical signal at the end of each line segment can be processed. For this reason the described dispersion compensation concept is suitable for point-to-point connections as well as also for optical networks.

In the optical transmission system shown with the line segments 1 and 2 the construction for both line segments 1 and 2 is the same. Especially the line segments 1 and 2 have the same length. A construction at variance thereto is possible, e.g. it is possible that different lengths or more or less than two line segments are present. A simple construction of the transmission routes or a retrofitting of existing transfer systems is possible if the amplifiers 21 and 22 as well as the dispersion compensation fibers 26 and 27 are attached at a common location.

Especially suitable for amplifiers 20 to 24 are so-called erbium-doped fiber amplifiers (EDFA), because these make possible direct optical amplification. This is especially of advantage with WDM systems.

It is furthermore of advantage for WDM systems with a variable number of channels and fixed total optical output power that the described optical transmission system be insensitive to occurring power fluctuations. This insensitivity is due to the limiting of high power to regions of low accumulated dispersion.

Besides the compensation of the dispersion of optical fibers by means of dispersion compensation fibers described above, it is also possible to effect the compensation through a fiber lattice array. For this case there are—as described above—also two fiber lattices to be provided, where attention must be paid to the fact that high optical signal power can only occur at points of low accumulated dispersion.

The invention claimed is:

1. An optical transmission system with one or several line sections with dispersion compensation fibers, comprising:

a first dispersion compensation fiber at the beginning of each section; and a second dispersion compensation fiber at the end of each line section, where a total accumulated dispersion of the first and the second dispersion compensation fibers of a line section corresponds as to amount to an accumulated dispersion of an optical fiber forming the line section, where an accumulated dispersion of the first dispersion compensation fiber attached at the beginning of each optical fiber is smaller as to amount than an accumulated dispersion of the dispersion compensation fiber attached at the end, and that the first dispersion compensation fiber attached at the start of each line section is connected directly to the optical fiber of that line section.

2. The optical transmission system of claim 1, further comprising a signal amplifier connected between the end of the second dispersion compensation fiber attached at the end of each line segment and the optical fiber forming the line segment.

3. The optical transmission system of claim 1, wherein the optical transmission system is formed by single channel transmission lines.

4. The optical transmission system of claim 1, wherein the optical transmission system is made up of multichannel transmission lines.

5. The optical transmission system of claim 1, wherein the optical transmission system forms point to point connections.

6. The optical transmission system of claim 1, wherein fiber lattices replace the dispersion compensation fibers.

* * * * *

UNITED STATES PATENT AND TRADEMARK OFFICE
CERTIFICATE OF CORRECTION

PATENT NO.   : 6,021,245
DATED        : February 1, 2000
INVENTOR(S)  : Matthias Berger et al.

It is certified that error appears in the above-identified patent and that said Letters Patent is hereby corrected as shown below:

<u>Title page,</u>
After Item [22], insert:
-- [30]   Foreign Application Priority Data
July 29, 1997    Germany ............. 19732568.8 --

Signed and Sealed this

First Day of June, 2004

JON W. DUDAS
*Acting Director of the United States Patent and Trademark Office*